UNITED STATES PATENT OFFICE.

CARL ADOLPH SAHLSTRÖM, OF JÖNKÖPING, SWEDEN, ASSIGNOR TO THE NORMAL COMPANY, (LIMITED,) OF WESTMINSTER, ENGLAND.

PROCESS OF MAKING EXTRACTS FROM FISH.

SPECIFICATION forming part of Letters Patent No. 353,822, dated December 7, 1886.

Application filed June 1, 1886. Serial No. 203,833. (No specimens.) Patented in England December 5, 1882, Nos. 5,786, 5,787, and 5,788; in Denmark May 1, 1886, No. 559; in Belgium May 21, 1886, No. 73,210, and in Italy September 30, 1886, No. 20,021.

*To all whom it may concern:*

Be it known that I, CARL ADOLPH SAHLSTRÖM, a subject of the King of Sweden, residing at Jönköping, in the Kingdom of Sweden, engineer, have invented certain new and useful Improvements in the Treatment of the Flesh or Material of Fish, Whales, and other Sea Animals to Obtain Useful Products therefrom, (for which Letters Patent in Great Britain, Nos. 5,786, 5,787, and 5,788, dated the 5th day of December, 1882, have been granted to Lorentz Albert Groth, of 30 Finsbury Pavement, London, England, as a communication to him from me; and for which Letters Patent in Denmark, No. 559, dated May 1, 1886, were granted to Thorsten Nordenfelt, of 53 Parliament Street, in the city of Westminster, England, civil engineer, as my assignee; and for which Letters Patent in Belgium, No. 73,210, dated May 21, 1886; and in Italy, No. 20,021, dated September 30, 1886, were granted to the Normal Company, (Limited,) of 52 Parliament Street, in the city of Westminster, England, as my assignees;) and I do hereby declare that the following is a full, clear, and exact description of the invention, which will enable others skilled in the art to which it appertains to make and use the same.

The object of this invention is the utilization of the shark, whale, seal, and other sea animals, and some kinds of fish, and the offal arising from the curing and drying of cod and other fish, and the production therefrom of a valuable and nutritious extract similar to the well-known Liebig's extract of meat.

For this purpose the raw material is cut up into as small pieces as possible by mechanical means, and is placed in a vat provided with stirring apparatus. A quantity of clean water, free from lime, is boiled and cooled down to from 6° to 15° centigrade, and to this is added so much dissolved hypermanganic alkali as will impart to the water a light-red color, (say from one to ten grams for every one hundred liters of water,) and from twenty to one hundred grams of water of ammonia. Sufficient of this liquor is added to the finely-cut raw material to give thereto the consistence of thin gruel, and the stirring apparatus is then set to work. After a period from ten to thirty minutes the mass is removed from the vat and is placed in a centrifugal apparatus, for the purpose of separating the liquor, which carries the fat with it. The inner part of the centrifugal apparatus is preferably covered with cloth. When all the fluid is separated, the mass is again soaked in fresh liquor and passed through the centrifugal apparatus, and this is done as often as may be found necessary to remove all the fat. All the fluid obtained is mixed together and left to stand in a deep tank for a period varying according to the temperature and until complete separation takes places. The fat and oil rise to the top of the liquid, and are removed for further treatment. The oil is separated for special treatment. The solid mass remaining in the centrifugal machine is also reserved for further treatment. The fluid thus obtained, free from any particle of fat, is then mixed with one to ten grams of common salt to each one hundred liters of the fluid, is boiled as quickly as possible until the albumen coagulates, and is then filtered. The clear fluid is evaporated *in vacuo* or otherwise till it attains the consistence of treacle. It is then poured into a shallow vessel which can be heated by steam. From one-tenth to eight per cent. of sugar is then added, for the purpose of preserving the extract and of imparting a taste thereto similar to that of Liebig's extract of meat. The extract is heated to a temperature of 100° centigrade, and kept constantly stirred until the desired consistence is attained.

Vegetables or extracts thereof, or any other flavoring matter, or flour, or other material for imparting a higher nutritive power or to give solidity, may be added at pleasure.

Having now particularly described and ascertained the nature of my said invention, and in what manner the same is to be performed, I declare that what I claim is—

The process of extracting the nutritive and valuable parts—namely, the albumen, salts, and other soluble matters—from the flesh of the shark, whale, seal, and other sea animals and fish, by cutting the raw material into pieces, then soaking it in cold water with which have been mixed ammonia and a disinfectant, such as hypermanganic alkali, then separating the liquor and evaporating the same to the required consistence with salt and other suitable ingredients, substantially as hereinbefore described.

CARL ADOLPH SAHLSTRÖM.

Witnesses:
  G. MAIR HOOD,
    *Solicitor, No. 1 Adelphi, Aberdeen.*
  WILL. MITCHELL, Jr.,
    *Writer, No. 1 Adelphi, Aberdeen.*